(12) United States Patent
Moravčík

(10) Patent No.: US 8,801,093 B2
(45) Date of Patent: Aug. 12, 2014

(54) BICYCLE SEAT

(75) Inventor: Martin Moravčík, L'ubochňa (SK)

(73) Assignee: MORGAW Group s.r.o., BanskáŠtiavnice (SL)

( * ) Notice: Subject to any disclaimer, the term of this patent is extended or adjusted under 35 U.S.C. 154(b) by 121 days.

(21) Appl. No.: 13/372,973

(22) Filed: Feb. 14, 2012

(65) Prior Publication Data
US 2013/0134748 A1    May 30, 2013

(30) Foreign Application Priority Data

Nov. 28, 2011   (SK) ................................ 50048-2011

(51) Int. Cl.
*B62J 1/00* (2006.01)

(52) U.S. Cl.
USPC ........................ 297/202; 297/214; 297/215.16

(58) Field of Classification Search
CPC ................ B62J 1/002; B62J 1/00; B62J 1/02
USPC ......... 297/202, 214, 215.16, 195.1, 208–209, 297/211
See application file for complete search history.

(56) References Cited

U.S. PATENT DOCUMENTS

| | | | | |
|---|---|---|---|---|
| 4,429,915 A | * | 2/1984 | Flager | 297/199 |
| 5,544,936 A | * | 8/1996 | Bigolin | 297/195.1 |
| 5,676,420 A | * | 10/1997 | Kuipers et al. | 297/204 |
| 5,692,801 A | * | 12/1997 | Yu | 297/195.1 |
| 5,823,618 A | * | 10/1998 | Fox et al. | 297/201 |
| 5,855,410 A | * | 1/1999 | Lin | 297/215.15 |
| 5,938,277 A | * | 8/1999 | Rioux et al. | 297/199 |
| 6,357,825 B1 | * | 3/2002 | Bavaresco | 297/201 |
| 6,773,061 B1 | * | 8/2004 | Shu | 297/195.1 |
| 8,002,346 B2 | * | 8/2011 | Wen | 297/201 |
| 2007/0210625 A1 | * | 9/2007 | Chen et al. | 297/202 |
| 2007/0273184 A1 | * | 11/2007 | Garneau | 297/195.1 |
| 2008/0251681 A1 | * | 10/2008 | Segato | 248/503.1 |
| 2009/0108643 A1 | * | 4/2009 | Yu | 297/214 |
| 2010/0019553 A1 | * | 1/2010 | Yu | 297/214 |
| 2012/0286548 A1 | * | 11/2012 | Bailie et al. | 297/201 |
| 2013/0257116 A1 | * | 10/2013 | Tseng | 297/202 |

FOREIGN PATENT DOCUMENTS

| | | |
|---|---|---|
| CZ | 1994-1879 | 7/1996 |
| SK | 284 883 | 1/2006 |
| SK | PP 50041-2010 | 3/2012 |
| SK | PP 50042-2010 | 3/2012 |

* cited by examiner

*Primary Examiner* — David R Dunn
*Assistant Examiner* — Alexander Harrison
(74) *Attorney, Agent, or Firm* — Collard & Roe, P.C.

(57) ABSTRACT

A bicycle seat has an arrow-shape sitting part with a recess has centered down the length of the sitting part top from the wide rear towards the tapered front. The sitting part consists of a framework, which forms the seat bottom; a core, which forms the seat center part and a seat cover which forms its top. Two feet protrude from the sitting part bottom in the longitudinal axis, one in its rear and other one in its front. Each foot forms a monolithic part together with the seat framework. The foot connects directly to the solid block with the hole perpendicular to the seat axis. A shock absorber is mounted on the solid block hole. A bolt passes through a hole in the shock absorber to fasten light-weight flat shaped strips on both its sides, the strips having a rectangular cross-section. Holes have been made in the strip ends.

5 Claims, 8 Drawing Sheets

BICYCLE SEAT

CROSS REFERENCE TO RELATED APPLICATIONS

Applicant claims priority under 35 U.S.C. §119 of Slovakian Application No. PP 50048-2011 filed Nov. 28, 2011, the disclosure of which is incorporated by reference.

BACKGROUND OF THE INVENTION

1. Technical Field

The present invention refers to a bicycle seat, mainly for sport bicycles, that have high demands made upon the bicycle components' weight.

2. Present State of the Art

At present, there have been a lot of different seat types on market. The Slovakian patent application SK 284883 discloses a bicycle seat, which consists of the two separated seats fitted on the support element fixed to the bicycle frame, and situated laterally to the bicycle travel direction. Each seat consists of, at least, the seat front (nose), rigid support element and, at least, the second movable part against its first part. The seat second part has been pivotally connected using a pivot, which defines its horizontal axis perpendicular on the bicycle travel direction. Both the seat front and second part have been covered using a first and second seat cover, made of soft materials. There is a channel or recess in the first seat cover grid line-up with the area where the rider's femur head point protrudes into his/her pelvis. There is a front projection down the length of the seat nose front edge, to which the first seat cover connects, and continues as far as the back recess made in each second seat cover. The Czech Republic patent application CZ 1994-1879 discloses a bicycle seat, which consists of a rigid framework, which consist of the sitting layer, yoke and the valve gas spring. The seat framework has been equipped with guiding elements of a guiding mechanism, which guides the seat framework on the yoke following the guiding mechanism path, where the yoke bottom has been fastened to the seatpost, and its top bearing area hinges on the gas spring shapeable bottom in the seat framework inside. The gas spring sheath has been equipped with, at least, a single valve, whereby the yoke bearing area together with the sheath shapeable bottom and gas spring pushes into the gas spring inside.

Slovakian Patent Application PP 50041-2010 discloses a fastener used to mount the seat on the bicycle seatpost, where the seatpost has been terminated transversely using an arc recess radius. It includes holes made in the front-to-back direction, the axes height shifted by the angle. A through-hole made in the cylinder cross direction to which the cross grooves made on both the cylinder ends or bottom correspond. Plugs featuring inside projections close the cylinder ends or bottoms. Holes have been made in the plug's center to connect them using connection accessories, for instance a screw and jig. Cone hollow rods have been inserted in the cylinder through-hole and the seatpost holes. The cone hollow rods feature cone ends and oval holes with the bevel inwards. The hollow rod, as inserted in the cylinder through-hole, passes through the jig hole with the set screws in the hollow rod oval holes and the spherical pressure areas.

Slovakian Patent Application PP 50042-2010 discloses a seat, which consists of an arrow-shape sitting part. A recess has been centred down the length of the sitting part top from the wide rear towards the tapered front up to the lost. Three feet have been mounted on the sitting part bottom, two on its rear spaced apart and the other one in its front. Each foot consists of the beam-shape bottom mounted onto the sitting part body with the flat block-shape top domed and the cross-hole made in the flat block. The foot mounted on the sitting part front has been connected to the feet in its rear using light-weight shaped strips arranged almost in parallel both in the horizontal and vertical direction with the ends bent out upwards and the mounting holes in the rear to fix them to the feet. There are longitudinal grooves in the strip centers to fix the jig for mounting the seat to the seatpost. The connection accessories are used to mount the feet on the strip. All the seat components have been made of strong and light-weight materials.

SUMMARY OF THE INVENTION

The present invention disclosed in this patent removes the limitations, because the seat has been built up of the arrow-shape sitting part. The recess has been centred down the length of the sitting part top from the wide rear towards the tapered front up to the lost. The two feet protrude from the sitting bottom in the longitudinal axis, one in its rear and the other in its front end. Each foot forms a monolithic part together with the seat framework. The foot connects directly to the solid block with the hole perpendicular to the seat axis. The feet and solid block form the monolithic part. The shock absorber has been mounted on the solid block. Alternatively, the foot connects directly to the split block with the hole perpendicular to the seat axis. The shock absorber has been mounted on the split block. The bolt passes through the shock absorber hole to fasten the light-weight flat shaped strips on both its sides. Rectangular cross-section strips have been used in this seat type. There are longitudinal grooves in the strip centers to fix the jig for mounting the seat to the seatpost. Holes have been made in the strip ends. There is a possibility to replace the strips with the rods, having either circular, oval, triangle or other polygon shaped holes. All the seat components have been made of strong and light-weight materials. The sitting part consists of a framework, which forms the seat bottom; a core, which forms the seat center part, and a seat cover, which forms its top. The core has been made of lightweight extruded polystyrene and/or other foam type material either with or without the addition of carbon and/or glass fibres. The framework is made of composite materials such as Kevlar and/or carbon fibre and/or glass fibre either with resin or plastic. Preferably, the strips can be made of metal or aluminium, titanium alloys, or plastics or plastics with carbon and/or a glass fibre addition, or they can be made of composite materials, such as Kevlar and/or carbon fibre and/or glass fibre with resin. The connection accessories may include, for instance either a shaft or screw, washer, nut or rivet, preferably also made of metal or aluminium, titanium alloys, or plastics or plastics with the carbon and/or glass fibre addition, or they can be made of composite materials, such as Kevlar and/or carbon fibre and/or glass fibre with resin.

BRIEF DESCRIPTION OF THE DRAWINGS

FIG. 1 depicts the seat in a side view.
FIG. 2 depicts the seat cross-section.
FIG. 3 depicts the seat exploded view of the seat.
FIG. 4 depicts a bottom view of the seat.
FIG. 5 depicts another embodiment of the seat in an exploded view.
FIG. 6 depicts a further embodiment of the seat in an exploded view.

FIG. 7 depicts the seat of FIG. 6 in a side view.

FIG. 8 depicts the seat of FIG. 6 in a bottom view.

DETAILED DESCRIPTION OF THE EMBODIMENTS

EXAMPLE 1

Figure 1:
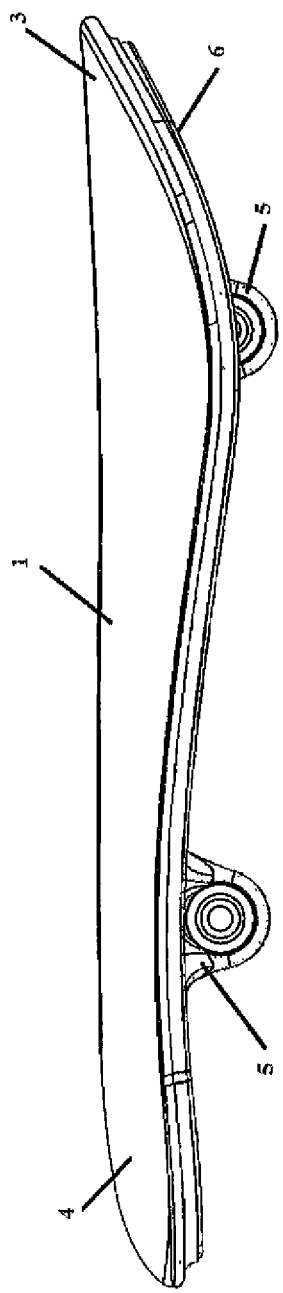
FIGS. 1 to 8 depict the seat according to the invention in different views.
Figure 2:
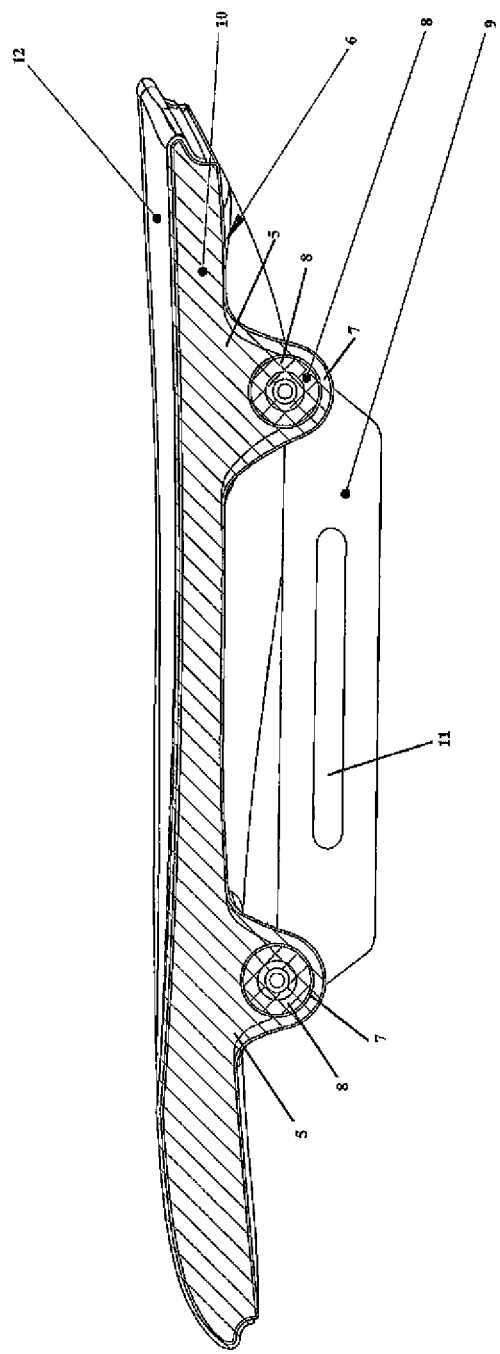
Figure 3:
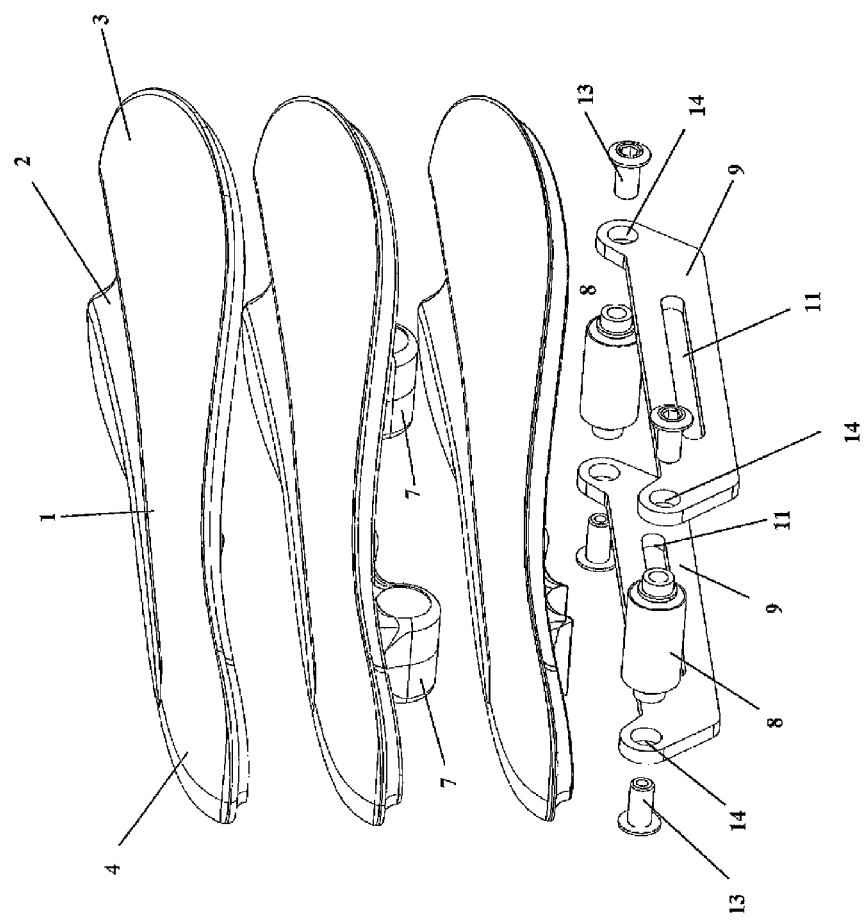
Figure 4:
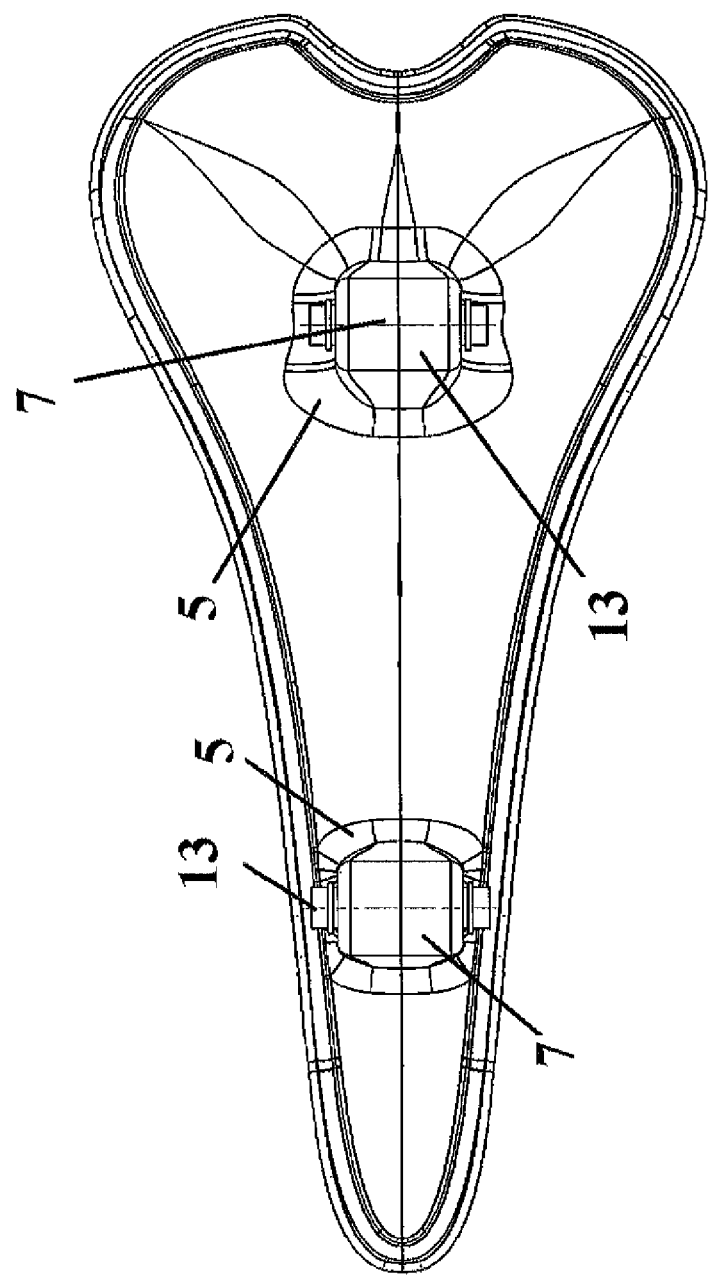

As shown in FIGS. 1-4, the seat consists of arrow-shape sitting part (1). Recess (2) has been centered down the length of the sitting part (1) top from the wide rear (3) towards the tapered front (4) up to the lost. Two feet (5) protrude from the sitting part bottom (1) in the longitudinal axis, one in its rear (3) and other one in its front (4). Each foot (5) forms a monolithic part together with the seat framework (6). The foot (5) connects directly to the solid block (7) with the hole perpendicular to the seat axis. The feet (5) and solid block (7) form a monolithic part, as shown in FIGS. 1-4. A shock absorber (8) has been mounted on the solid block (7). A bolt (13) passes through the shock absorber (8) hole to fasten the light-weight flat shaped strips (9) on both sides of the shock absorber. The strips (9) have a rectangular cross section and have been used in this seat type. There are longitudinal grooves in the strip centers (9) to fix the jig for mounting the seat to the seatpost. Holes (14) have been made in the strip ends (9). All the seat components have been made of the rigid light-weight material. Sitting part (1) consists of the framework (6), which forms the seat bottom; core (10), which forms the seat centre part and seat cover (12), which forms its top. The core (10) is made of light-weight extruded polystyrene and/or other foam type material, either with or without a carbon and/or glass fibre addition. The framework (6) is made of composite materials, such as Kevlar and/or carbon fibre and/or glass fibre. Preferably, the strips (9) are made of metal or aluminium, titanium alloys, or plastics or plastics with a carbon and/or glass fibre addition, or they can be made of composite materials, such as Kevlar and/or carbon fibre and/or glass fibre with resin. There is a possibility to replace the strips with rods (15) shown in FIG. 5, having the projections with either circular, oval, triangle or other polygon shaped holes (17). The connection accessories (13) may include, for instance, either the shaft, or screw, washer, nut or rivet, preferably also made of metal or aluminium, titanium alloys, or plastics or plastics with a carbon fibre and/or glass fibre addition, or they can be made of composite materials, such as Kevlar and/or carbon fibre and/or glass fibre with resin.

EXAMPLE 2

Figure 5:
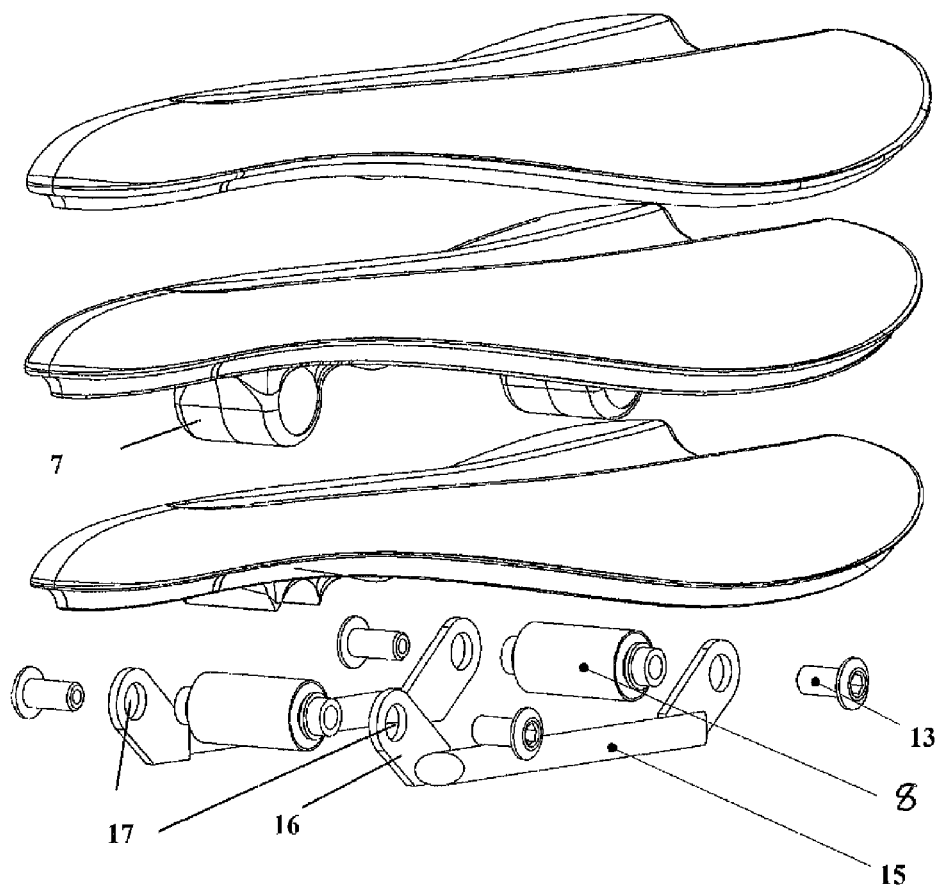
Figure 6:
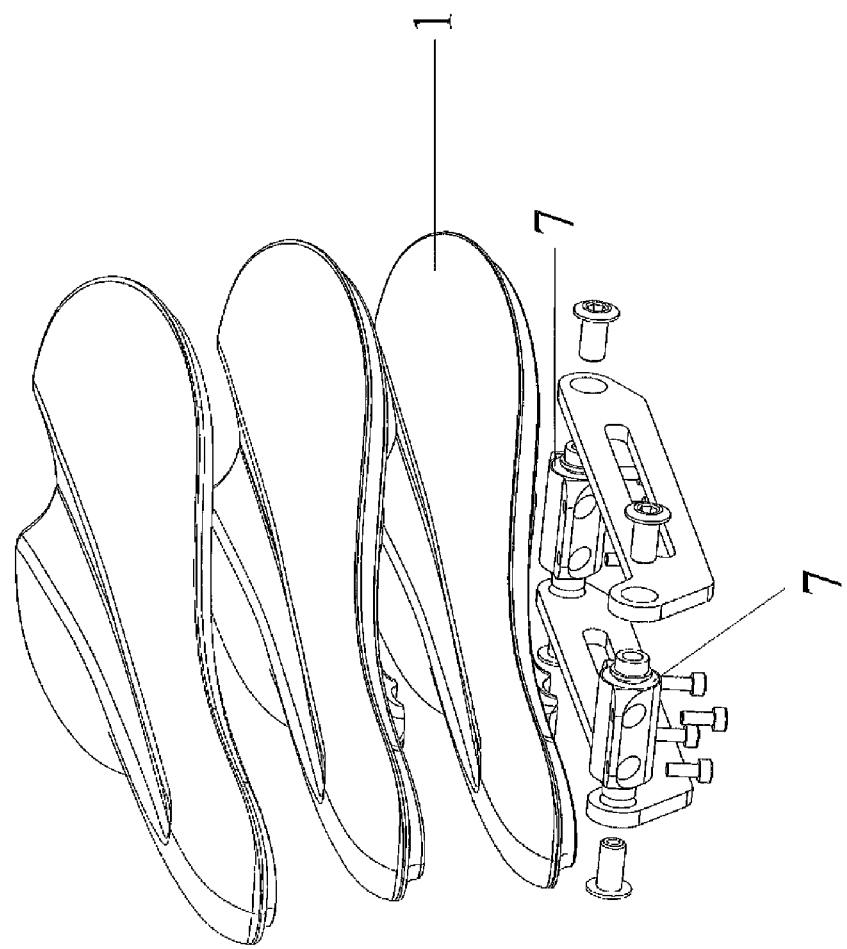
Figure 7:
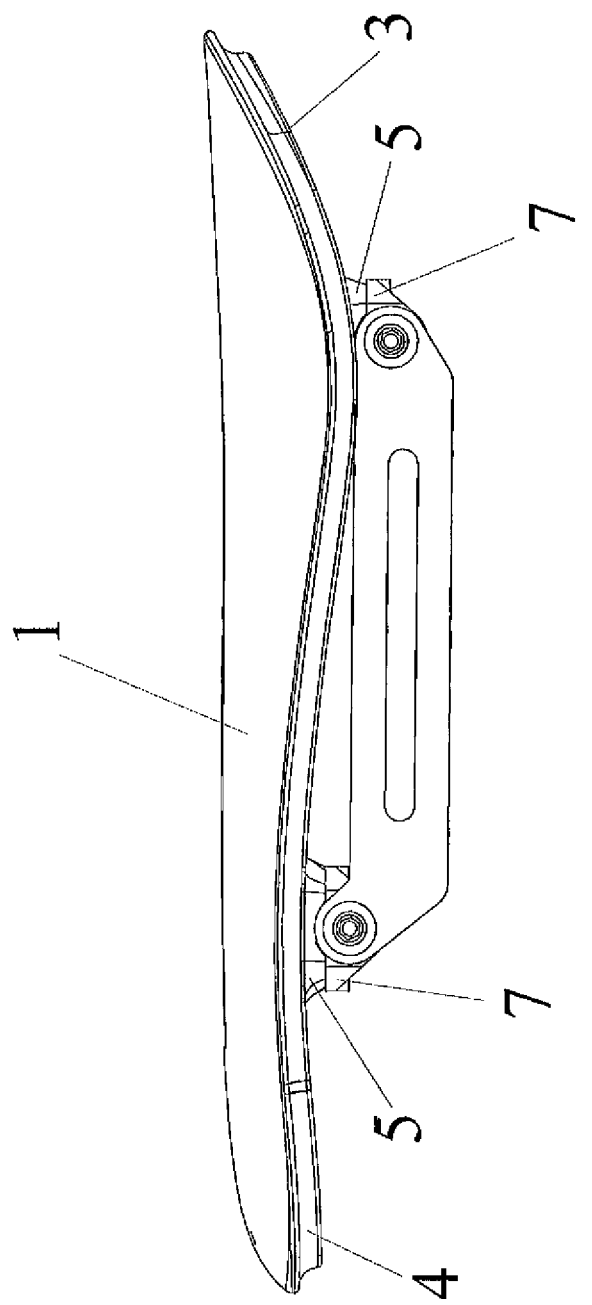
Figure 8:
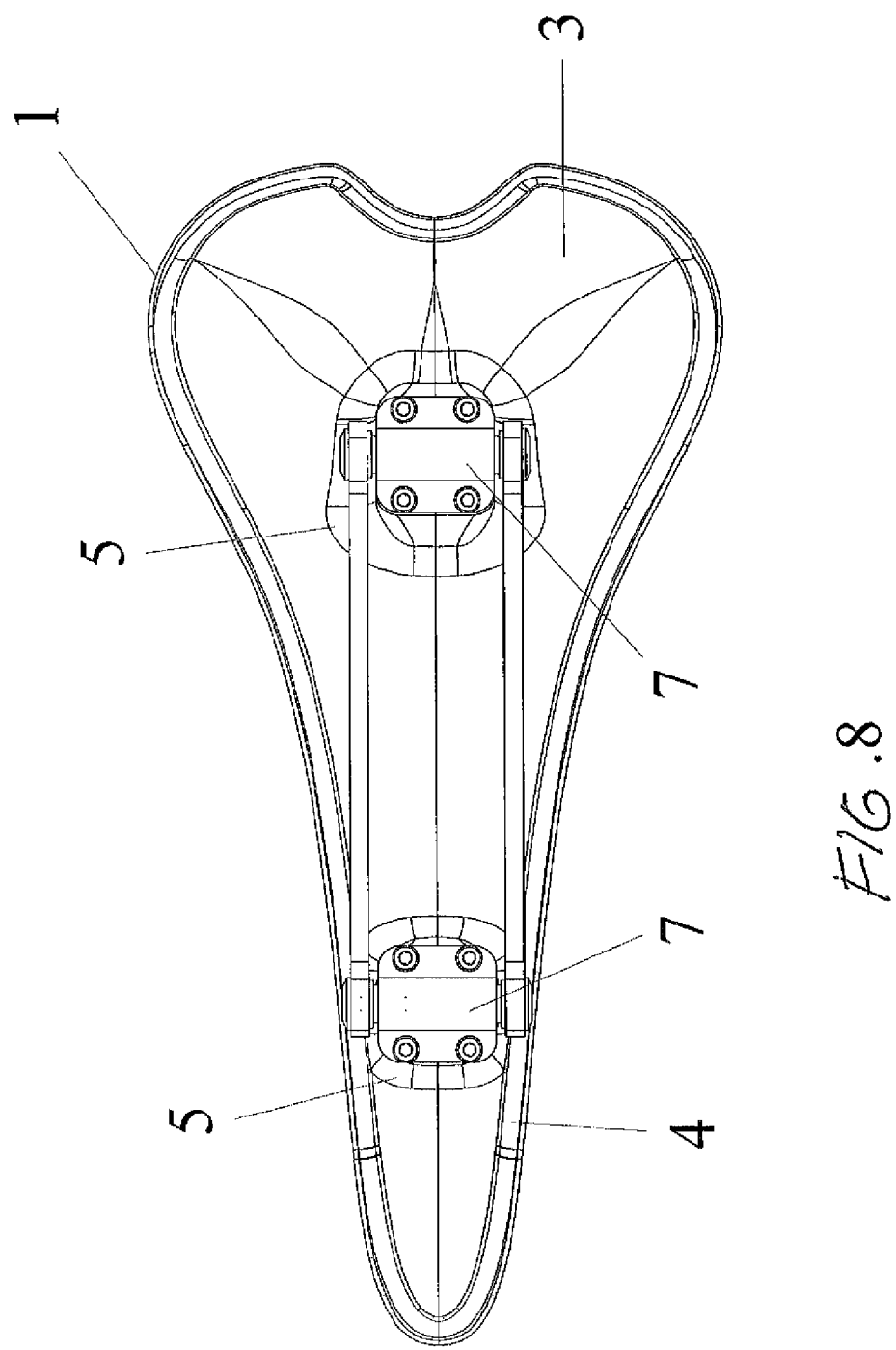

In an alternative embodiment shown in FIGS. 6-8, the seat consists of the arrow-shape sitting part (1). The recess (2) has been centered down the length of the sitting part (1) top from the wide rear (3) towards the tapered front (4) up to the lost. The two feet (5) protrude from the sitting part bottom (1) in the longitudinal axis, one in its rear (3) and other one in its front (4). Each foot (5) forms a monolithic part together with the seat framework (6). As shown in FIGS. 5-6, foot (5) connects directly to the split block (7) with the hole perpendicular to the seat axis. The connection accessories (13) are used to mount the split block (7). The shock absorber (8) has been mounted on the solid block (7). The bolt (13) passes through a hole in the shock absorber (8) to fasten light-weight flat shaped strips (9) on both its sides. Rectangular cross-section strips (9) have been used in this seat type. There are longitudinal recesses (11) in the strip centers (9) to fix the jig for mounting the seat to the seatpost. Holes (14) are made in the strip ends (9). All the seat components have been made of rigid light-weight material. Sitting part (1) consists of the framework (6), which forms the seat bottom; the core (10), which forms the seat centre part and the seat cover (12), which forms its top. Core (10) is made of light-weight extruded polystyrene and/or other foam type material either with or without a carbon and/or glass fibre addition. The framework (6) is made of the composite materials, such as Kevlar and/or carbon fibre and/or glass fibre with resin, and/or plastic and/or plastic with carbon and glass fibre addition. Preferably, the strips (9) are made of metal or aluminium, titanium alloys, or plastics or plastics with the carbon and/or glass fibre addition, or they can be made of composite materials, such as Kevlar and/or carbon fibre and/or glass fibre with resin. There is a possibility to replace the strips (9) with the rods (15), having the projections with either the circular, oval, triangle or other polygon shaped holes (17), as shown in FIG. 5. The connection accessories (13) may include, for instance either a shaft or screw, washer, nut or rivet, preferably also made of metal or aluminium, titanium alloys, or plastics or plastics with the carbon and/or glass fibre addition, or they can be made of composite materials, such as Kevlar and/or carbon fibre and/or glass fibre with resin.

What is claimed is:

1. A bicycle seat, comprising:
an arrow-shaped sitting part having a recess centered down a length of a top of the sitting part from a wide rear towards a tapered front, wherein the sitting part comprises:
a framework forming a seat bottom;
a core, which forms a seat center part;
a seat cover, which forms the top;
two feet protruding from the sitting part bottom along a longitudinal seat axis, one of said feet being in the rear and the other one of said feet being in the front, each one of said feet forming a monolithic part together with the framework;
a block integrally formed with each of the feet, each of said blocks having a hole that extends perpendicular to the longitudinal seat axis;
a shock absorber mounted in each block and having a hole;
a bolt passing through the hole in each shock absorber; and
flat shaped strips fastened on both sides of the shock absorbers via the bolts, each of said strips having a rectangular cross-section and having a flat face and two longitudinal edges, wherein the strips are mounted to the shock absorbers so that the flat face is disposed perpendicular to the seat bottom, and wherein ends of the strips have holes.

2. A bicycle seat, comprising:
an arrow shaped sitting part having a recess centered down a length of the sitting part top from a wide rear towards a tapered front, the sitting part comprising:
a framework which forms a seat bottom;
a core which forms a seat center part;
a seat cover which forms the top;
two feet protruding from the sitting part bottom along a longitudinal axis of the seat, one of said feet being in the rear and other one of said feet being in the front, each one of said feet forming a monolithic part together with the framework;
solid blocks with a hole perpendicular to the seat axis, wherein each of said feet are connected to a respective one of the blocks;
a shock absorber mounted in the hole in each of the blocks;

a bolt that passes through a hole in each shock absorber; and flat shaped strips fastened on both sides of the shock absorbers via the bolts, said strips each having a rectangular cross-section and having a flat face and two longitudinal edges, wherein the strips are mounted to the shock absorbers so that the flat face is disposed perpendicular to the seat bottom, and wherein ends of the strips have holes.

3. The seat according to claim 1, wherein each bolt is made of a material selected from the group consisting of metal, plastic, plastics with a carbon or glass fibre addition, and composite materials.

4. The seat according to claim 1, wherein the core is made of extruded polystyrene, wherein the framework is made of composite materials or of plastic with a carbon and/or glass fibre addition and wherein the strips are made of composite materials.

5. A bicycle seat, comprising:

an arrow shaped sitting part having a recess centered down a length of the sitting part top from a wide rear towards a tapered front, the sitting part comprising:

a framework which forms a seat bottom;

a core which forms a seat center part;

a seat cover which forms the top;

two feet protruding from the sitting part bottom along a longitudinal axis of the seat, one of said feet being in the rear and other one of said feet being in the front, each one of said feet forming a monolithic part together with the framework;

solid blocks with a hole perpendicular to the seat axis, wherein each of said feet are connected to a respective one of the blocks;

a bolt that passes through a hole in each shock absorber; and rods having projections with either circular, oval, triangle or other polygon shaped holes, said rods being mounted on both sides of the shock absorbers via the bolts, wherein the rods are made of plastics or composite materials.

* * * * *